United States Patent
Mehta et al.

(10) Patent No.: US 8,635,121 B2
(45) Date of Patent: *Jan. 21, 2014

(54) USER SEGMENTATION FOR LISTINGS IN ONLINE PUBLICATIONS

(71) Applicant: eBay Inc., San Jose, CA (US)

(72) Inventors: Mihir Mehta, Tamil Nadu (IN); Srinivasa Raghavan Ambikapathy, Tamil (IN); Monica Swamiraj, Tamil Nadu (IN); Kumaresan Manickavelu, Port Blair (IN); Harishankar Nagarajan, Tamil Nadu (IN); Badrinarayanan Ramaswami, Tamil Nadu (IN)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,926

(22) Filed: Dec. 20, 2012

(65) Prior Publication Data

US 2013/0110663 A1    May 2, 2013

Related U.S. Application Data

(63) Continuation of application No. 12/752,022, filed on Mar. 31, 2010, now Pat. No. 8,364,560.

(51) Int. Cl.
  *G06Q 30/00* (2012.01)
(52) U.S. Cl.
  USPC .......................... 705/26.7; 705/26.1
(58) Field of Classification Search
  USPC .............................. 705/26.1–27.2
  See application file for complete search history.

(56) References Cited

U.S. PATENT DOCUMENTS

| | | | |
|---|---|---|---|
| 5,860,068 A | 1/1999 | Cook | |
| 6,496,744 B1 | 12/2002 | Cook | |
| 8,364,560 B2 | 1/2013 | Mehta et al. | |
| 2001/0047348 A1 | 11/2001 | Davis | |
| 2003/0033305 A1 | 2/2003 | O'connor | |
| 2003/0163399 A1* | 8/2003 | Harper et al. | 705/35 |
| 2003/0167195 A1 | 9/2003 | Fernandes | |
| 2005/0102191 A1 | 5/2005 | Heller | |
| 2007/0028266 A1 | 2/2007 | Trajkovic et al. | |
| 2008/0222127 A1 | 9/2008 | Bergin | |
| 2009/0083365 A1 | 3/2009 | Feldman | |

(Continued)

OTHER PUBLICATIONS

U.S. Appl. No. 12/752,022 Non-Final Office Action mailed Oct. 27, 2010, 3 pgs.

(Continued)

*Primary Examiner* — Jeffrey A Smith
*Assistant Examiner* — Ethan D Civan
(74) *Attorney, Agent, or Firm* — Schwegman, Lundberg & Woessner, P.A.

(57) ABSTRACT

A method and a system segmenting a user viewing listings in online publications to render the listing according to a rule received from a seller. For example, the system receives one or more listings submitted by a seller. The listing comprises one or more modifiable parameters. The system also receives a rule from the seller, the rule associated with a first listing of the one or more listings. A profile is associated with a user based on data collected about the user. The first listing is rendered to the user based on the profile associated with the user and the rule by modifying the one or more parameters.

21 Claims, 9 Drawing Sheets

(56) References Cited

U.S. PATENT DOCUMENTS

2009/0168624 A1    7/2009  Scibora
2010/0057806 A1*   3/2010  Neal et al. .................... 707/740
2010/0124907 A1*   5/2010  Hull et al. .................. 455/412.1
2011/0246323 A1   10/2011  Mehta et al.

OTHER PUBLICATIONS

U.S. Appl. No. 12/752,022, Advisory Action mailed Aug. 22, 2011, 3 pgs.
U.S. Appl. No. 12/752,022, Final Office Action mailed Apr. 4, 2011, 19 pgs.
U.S. Appl. No. 12/752,022, Non Final Office Action mailed May 10, 2012, 12 pgs.
U.S. Appl. No. 12/752,022, Notice of Allowance mailed Sep. 26, 2012, 9 pgs.
U.S. Appl. No. 12/752,022, Response filed Aug. 10, 2012 to Non Final Office Action mailed Aug. 10, 2012, 11 pgs.
U.S. Appl. No. 12/752,022, Response filed Feb. 28, 2011 to Non Final Office Action mailed Oct. 27, 2010, 15 pgs.
U.S. Appl. No. 12/752,022, Response filed Aug. 4, 2011 to Final Office Action mailed Apr. 4, 2011, 12 pgs.
Ferran, Nuria, et al., "Towards Personalization in Digital Libraries Through Ontologies", Library management, vol. 26, No. 4/5, (2005), 206-217.

* cited by examiner

USER SEGMENTATION FOR LISTINGS IN ONLINE PUBLICATIONS

CROSS REFERENCE TO RELATED APPLICATION

This application is a Continuation of U.S. patent application Ser. No. 12/752,022, filed Mar. 31, 2010, which application is incorporated herein by reference in its entirety.

TECHNICAL FIELD

The present application relates generally to the technical field of information management and, in one specific example, to user segmentation for listings in online publications.

BACKGROUND

Online publication systems may receive listings from users and publish those listings on a website so that they are viewable by other users. In some instances, the online publication system may comprise an online marketplace where sellers may post listings that describe items or services for sale that are viewable by users.

BRIEF DESCRIPTION OF THE DRAWINGS

Some embodiments are illustrated by way of example and not limitation in the figures of the accompanying drawings in which.

DETAILED DESCRIPTION

Example methods and systems to render listings based on user segmentation in a publication system are described. In the following description, for purposes of explanation, numerous specific details are set forth in order to provide a thorough understanding of example embodiments. It will be evident, however, to one skilled in the art that the present invention may be practiced without these specific details.

In an online publication system, one or more listings may be posted that are viewable by users. In some instances, the listings may describe items for sale by a seller. In various embodiments, a segmentation engine may be used to modify how a listing is rendered based on a user segmentation associated with the particular user viewing the listing.

The segmentation engine may associate a user with one or more profiles. The profiles may include data about the user such as demographic information such as age and sex, buying patterns, and buyer "stickiness." Buyer stickiness, as used herein, is defined as a metric to measure a buyer's loyalty to one or more sellers. The stickiness of a buyer may be measured based on a buyer's history with a seller associated with a particular listing and/or based on the buyer's history with other merchants.

When a seller provides a listing to be published within the online publication system, the seller may also provide one or more rules for rendering the listing based on the profiles. Based on the rules, and the profile associated with the user, a listing is rendered for the user. In some instances, the listing may include different terms or conditions and/or highlight various features of an item for sale. For example, a sticky buyer may be offered free shipping while an infrequent buyer may have to pay for shipping. In a further example, a female buyer may be shown a listing showing the item for sale in pink while a male buyer may be shown the same item in black.

Figure 1:
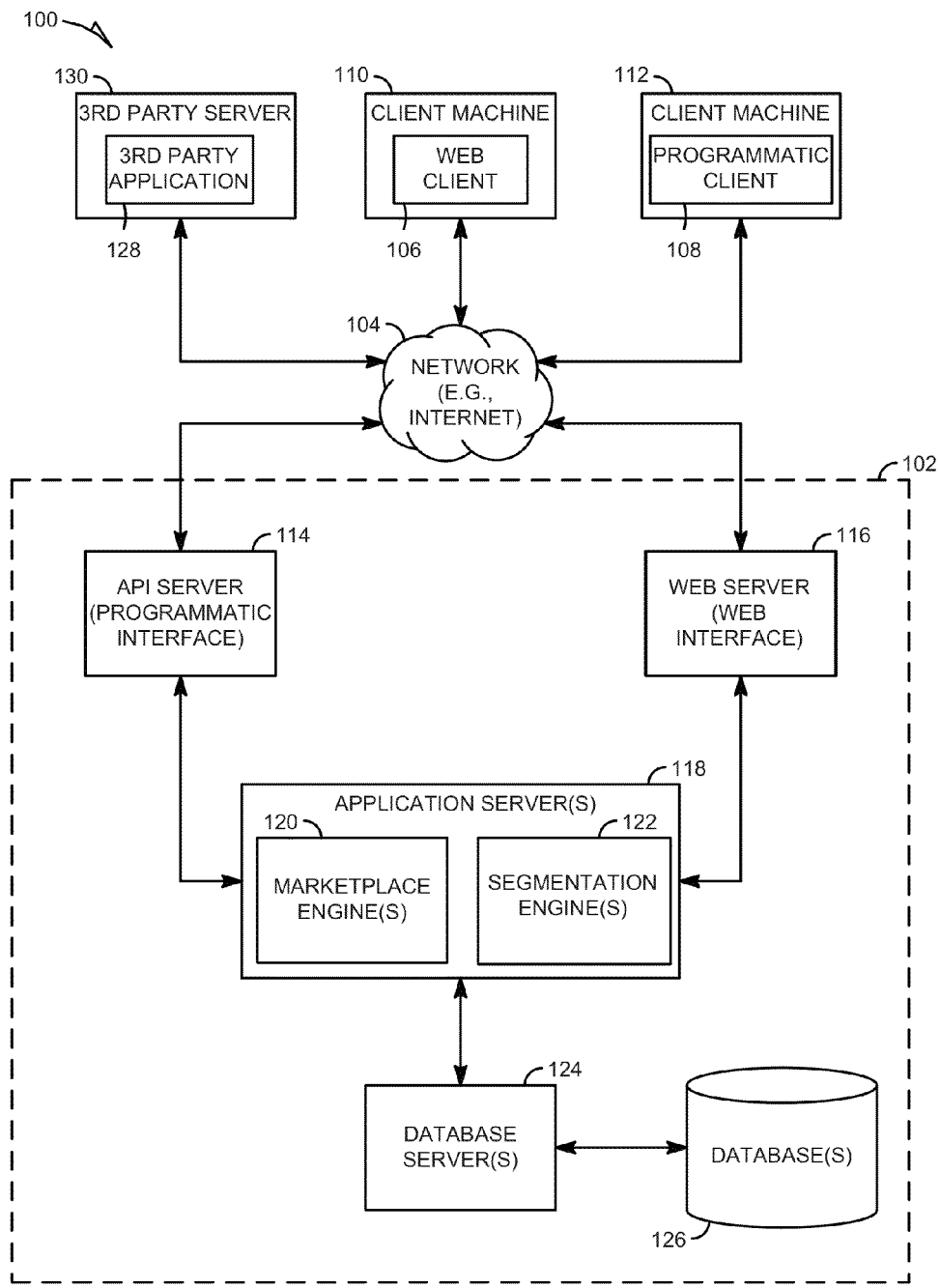
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, and provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Washington State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace engine(s) 120 and segmentation engine(s) 122. The application servers 118 are, in turn, shown to be coupled to one or more databases servers 124 that facilitate access to one or more databases 126.

The marketplace engine(s) 120 may provide a number of marketplace functions and services to users that access the networked system 102. The segmentation engine(s) 122 may likewise provide a number of segmentation services and functions to users such as buyers and sellers. The segmentation engine(s) 122 may allow sellers to specify how a listing should be rendered to potential buyers based on a profile associated with the buyers for items for sale that are made available via the marketplace engine(s) 120. While the marketplace and segmentation engines 120 and 122 are shown in FIG. 1 to both form part of the networked system 102, it will be appreciated that, in alternative embodiments, the segmentation engine(s) 122 may form part of a segmentation service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and segmentation engines 120 and 122 could also be implemented as standalone software programs, which do not necessarily have networking capabilities.

The web client 106 accesses the various marketplace and segmentation engines 120 and 122 via the web interface supported by the web server 116. Similarly, the programmatic client 108 accesses the various services and functions provided by the marketplace and segmentation engines 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or segmentation functions that are supported by the relevant applications of the networked system 102.

Figure 2:
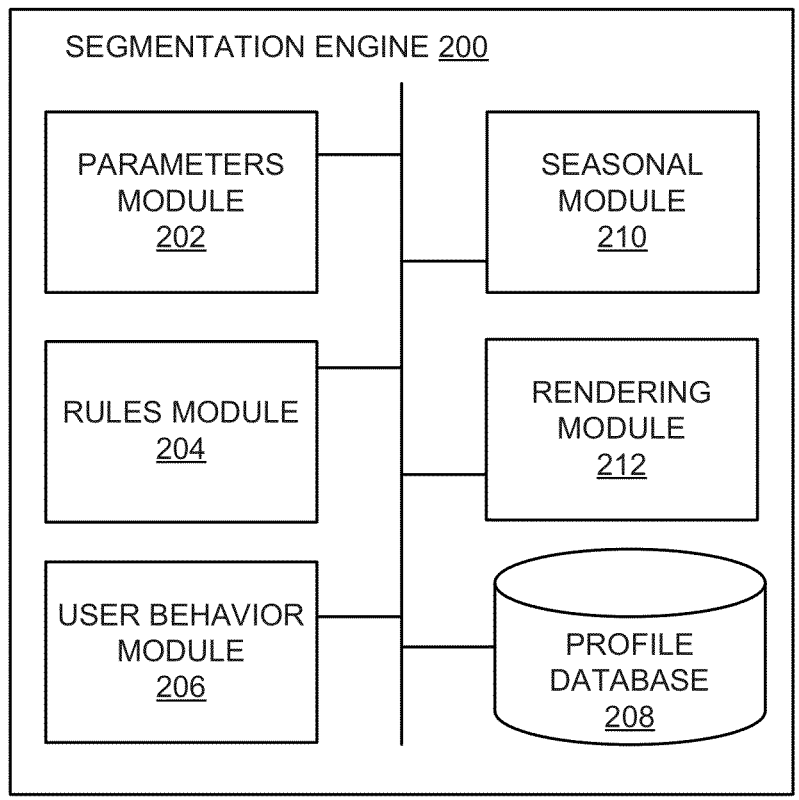
FIG. 2 is a block diagram of a segmentation engine according to an example embodiment.

FIG. 2 is a block diagram of a segmentation engine 200 according to an example embodiment. The segmentation engine 200 may be the same as or similar to the segmentation engine 122 of FIG. 1. The segmentation engine 200 operates in conjunction with one or more marketplace engine(s) 120 in the online publication system (or the networked system 102) to render one or more listings for display to a user based on a profile associated with the user.

The parameters module 202 is to identify one or more parameters of a listing provided by a seller that may be modified by the segmentation engine 200. Some of the parameters that may be modified include, but are not limited to, price, color, item title, item description, item picture, shipping options, warranties offered, return policy, and sale type (e.g., auction or buy it now).

The parameters module 202 accesses one or more options associated with each of the identified parameters. The options each correspond to a particular parameter. In some instances, two or more parameters may be associated with each other so that, based on the option associated with a particular parameter for a particular listing, another parameter associated with the particular listing may be automatically assigned to a specific option. For example, if the parameter "item color" is associated with the option "pink," the parameter "item picture" is automatically assigned to a picture of the item in the color pink. Each parameter may correspond to an option preselected as a default option.

The rules module 204 provides a rules interface for a seller to provide one or more rules for rendering the listing to potential buyers. The interface may include the parameters of the parameters module 202 or some portion thereof. The portion of the parameters may be selected based on, for example, a department corresponding to the item for sale, the seller's history, a season (e.g., holidays) during which the listing is submitted, features specific to the item listed, and other listings for items for sale submitted by the same seller.

At least a portion of the parameters selected and the rules interface is provided to the seller to provide one or more rules for rendering the listing to a potential buyer. In some instances, the rules may be provided by the seller according to a profile of a group of users. The profiles correspond to a group of users that share one or more characteristics. The users may be grouped according to demographic information such as age and gender, and buying habits such as monthly expenditures and departments associated with the items purchased. A description of the profiles may be displayed as part of the rules interface. In some instances, only a portion of the profiles may be provided to the seller. For example, if the item for sale is in the electronics department, only profiles associated with users who regularly buy electronics may be provided. In some instances, a seller may be able to restrict certain users from accessing the listing based on a profile. For example, a wine merchant may choose to restrict users associated with a profile of people below a legal drinking age from viewing a listing describing a bottle of wine.

In some instances, the rules interface is configured to receive rules as "if, then, else" statements. A single statement may include additional "if, then" clauses to identify additional profiles. The statement, when completed by the seller may read, in one example, "if the buyer is associated with profile A (males age 20-25), then render the listing with image 1, if the buyer is associated with profile C (males age over 40, spends at least $100 per month), then offer a 10% discount, else render the listing with image 0 and offer no discount."

In some instances, the rules module 204 may access a record of past sales and rules used to render the listings. The rules module 204 may suggest one or more rules to a seller. For example, in the department "books," the rules engine 204 may suggest that the seller offer free shipping to profiles associated with females age 20-25 based on previous successful transactions where other sellers offered free shipping. In another instance, the rules engine 204 suggests providing a warranty to buyers who associated with a profile that corresponds to "sticky" users who frequently make repeat purchases from the same seller.

A user behavior module 206 collects data about one or more potential buyers such as demographic data, purchasing data, and stickiness data. The user behavior module 206 may store the data in a profile database 208. In the profile database 208, the user behavior data may be stored according to one or more profiles. For example, a first profile may be associated with males age 20-25, a second profile may be associated with females age 20-25, and a third profile may include males above age 40 and that spend at least $100 per month. A user may belong to one or more profiles. For example a user may belong to the first profile (males age 20-25) and to another profile (people who spend more than $100 per month on video games and accessories).

A seasonal module 210 is to access seasonal data that may further be used to render the listing. The seasonal data may identify a particular period as being associated with a particular holiday. For example, November 1 to December 24 may be identified as a "Holiday Shopping Season" including holidays such as Christmas, Chanukah, Kwanzaa, and the winter solstice. For listings to be rendered during this period of time, a seller may provide rules for rendering the listing in accordance with a particular tradition. For example, a seller may wish to provide a "Christmas discount" to users associated with particular profiles for listings of nativity scenes and to provide a "Chanukah discount" to users associated with other profiles for listings of menorahs.

Alternatively or additionally, a profile associated with a buyer may indicate a seasonal tradition observed by the buyer. For example, a "Profile C" may indicate that the buyer celebrates Christmas while a "Profile K" indicates that the buyer celebrates Kwanzaa. Using the rules module 204 in conjunction with the seasonal module 210, the seller may, for example, specify that buyers associated with "Profile C" be offered guaranteed shipping before Christmas Day (December 25th) and the buyers associated with "Profile K" be offered guaranteed shipping before the first day of Kwanzaa (December 26th).

A rendering module 212 is to render a listing to a user based on a profile associated with the user and the seller's rules. In response to a query or other browsing activity, the rendering module 212 may render one or more listings to be displayed to the user. When rendering more than one listing (e.g., in a results list in response to a query) the rendering module 212 may access rules associated with more than one seller.

Figure 3:
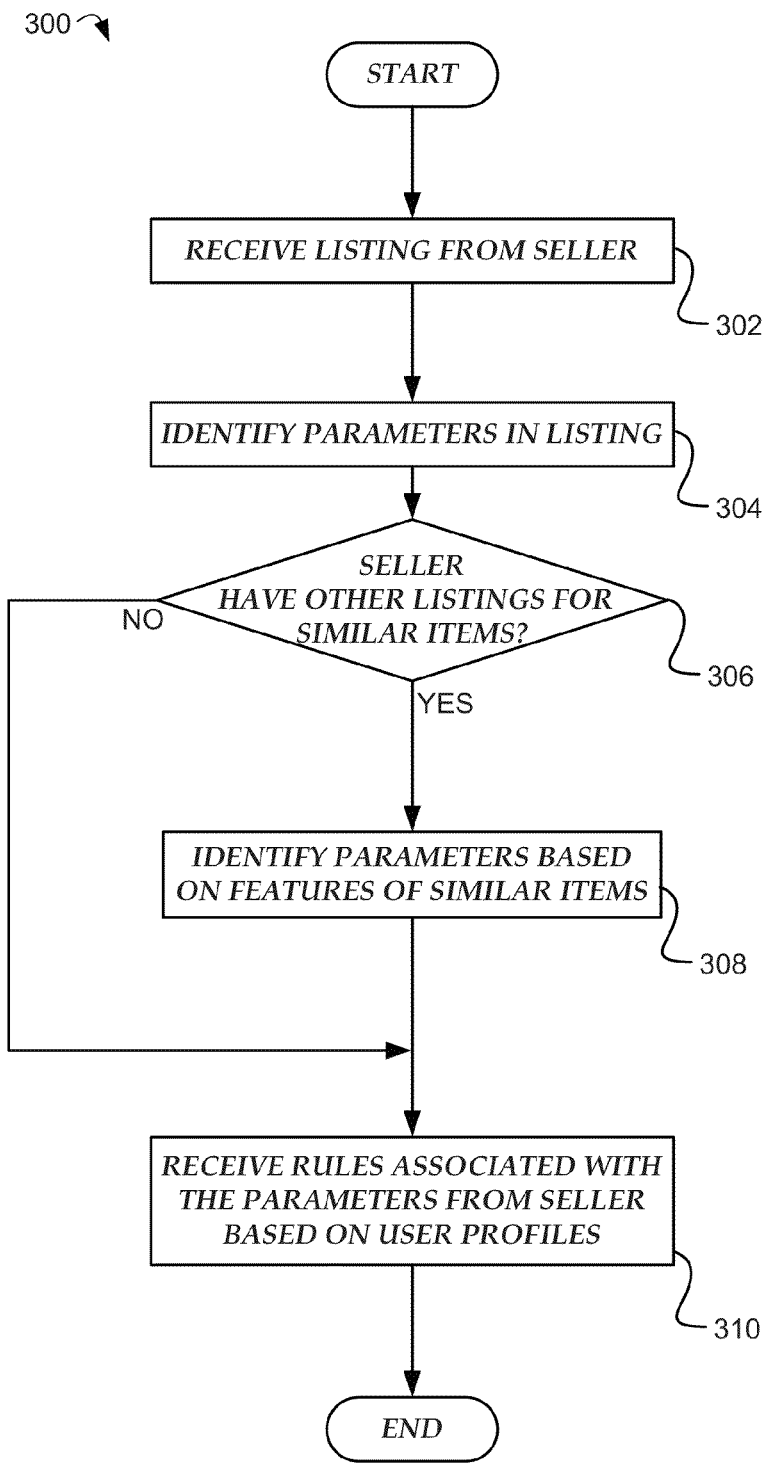
FIG. 3 is a flow chart of an example method to prepare a listing for user segmentation according to an example embodiment.

FIG. 3 is a flow chart of an example method 300 to prepare a listing for user segmentation according to an example embodiment. The method 300 may be performed when a listing is received from a seller, in a step 302. Alternatively or additionally, the method may be performed some period of time after a listing has been submitted.

When the listing is received from the seller, the seller may associate the listing and/or an item for sale described in the listing with a product description in a catalog. The product description may describe a mass-produced or fungible product having standard features and characteristics.

In a step 304, one or more parameters in the listing are identified. The parameters may include, but are not limited to: price, shipping options, warranty, product description, product image, and a background graphic or color. The parameters may each be associated with one or more options including a default option that may be provided by (or selected by) the seller. For example, the price parameter may be associated with a default option such as "no discount" and with additional options such as "10% discount," "$10 discount," or a new price.

In a step 306, a determination is made that the seller has previously submitted other listings that describe similar items. The similar items are substantially similar items that differ from the present listing by a feature such as size, color, seasonal edition, or the like.

In a step 308, where the seller has previously listed a plurality of similar listings, one or more product features (such as color, model number, size, etc.) may be identified as parameters. To illustrate, if a seller submits a first listing describing a sweater in blue and submits a second listing describing the same sweater in pink, the parameter "product color" may be identified and associated with the options "blue" and "pink."

In a step 310, rules associated with the identified parameters are received from the seller based on user profiles. The rules indicate that when the listing is provided to a potential buyer, if the potential buyer is associated with a certain user profile, that the listing be modified in a certain way. For example, a seller may specify that users belonging to a "Profile A" be shown a listing that offers free shipping and that users belonging to a "Profile B" be shown a listing having a different background. In some instances, the seller may specify that certain profiles be shown an alternative listing. For example, a seller may specify potential buyers associated with a "Profile TW" (including teenage women) be shown a separate listing for a similar item (identified in step 308) in another color, e.g., pink.

In some embodiments, a seller may maintain one of more sets of rules that were previously provided. The seller may then select the desired set of rules when submitting a listing or provide a new set of rules. A seller may be able to specify a default set of rules that is applied to each new listing if no other set of rules is specified. In some instances, the seller may submit rules to be applied to more than one listing.

Figure 4:
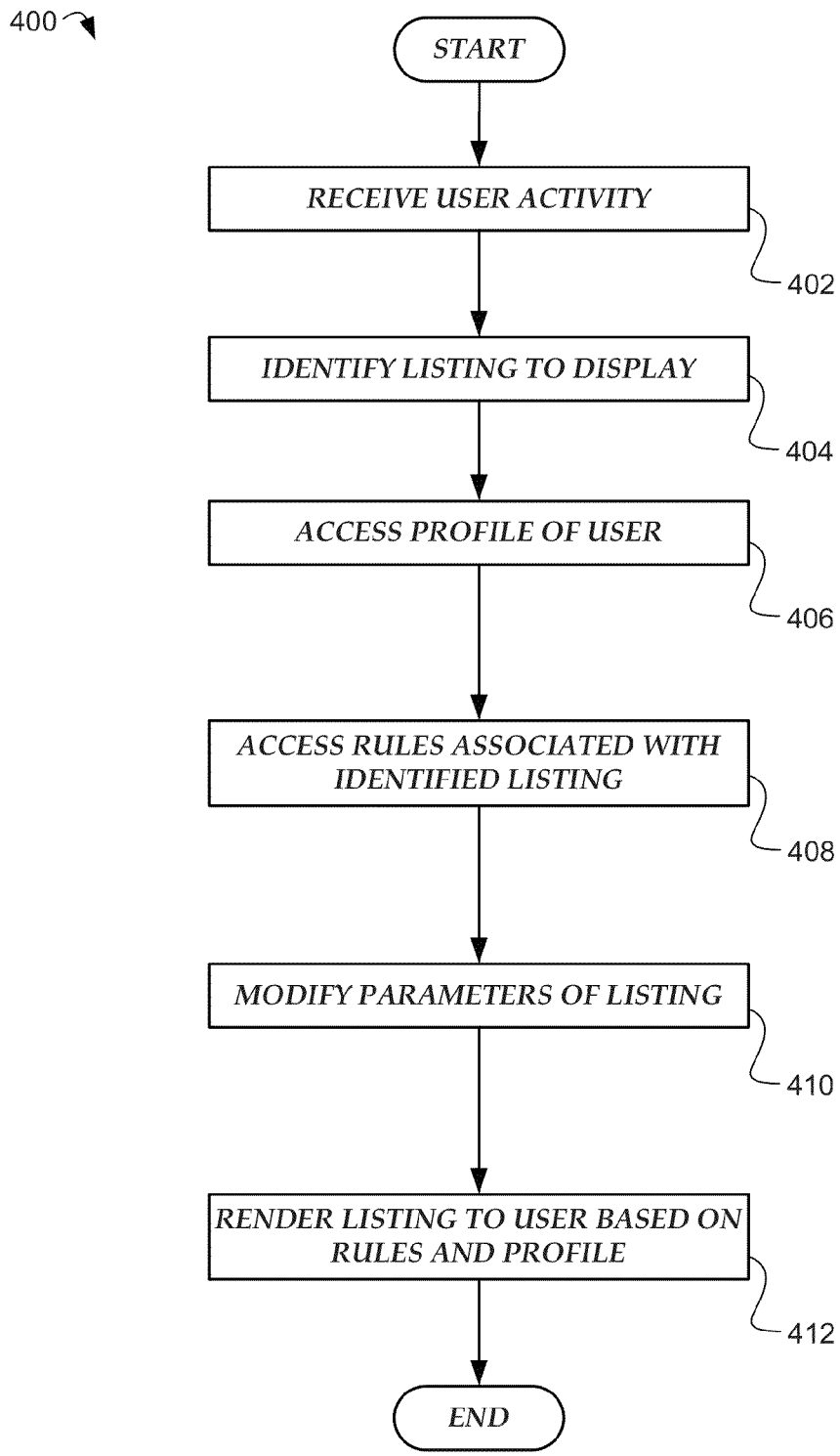
FIG. 4 is a flowchart of an example method to provide a listing to a segmented user according to an example embodiment.

FIG. 4 is a flowchart of an example method 400 to provide a listing to a segmented user or potential buyer according to an example embodiment. In the method 400, the user has previously been associated with one or more profiles based on demographic information, buying history and other information known about the user.

In a step 402, user activity is received via a user interface. The user activity may be submission of a query, navigation within a product hierarchy or catalog provided by the online publication system, or the like. Based on the user activity, one or more listings to be provided to the user are identified in a step 404.

In a step 406, at least one profile of the user is accessed. The profile may be previously associated with the user and stored as part of a user account or may be determined once the user activity has been received. The profiles may be associated with a user according to department. For example, when a listing is identified in the step 404, the listing may be associated with a particular department such as shoes. A user may be associated with a first profile for the department "shoes" and other profiles for other departments. The first profile is selected from the other profiles based on the identified listing being also associated with the department "shoes."

In a step 408, the rules from the seller associated with the identified listing are accessed. In some embodiments, only the portion of the rules that are associated with the particular profile of the user are accessed.

In a step 410, the parameters of the listing are modified based on the rules of step 408 and the profile of step 406. Alternatively, the parameters may be generated, instead of modified, based on the rules and profile. In a step 412, the listing is rendered or otherwise provided to the user based on the rules and the profile.

Figure 5:
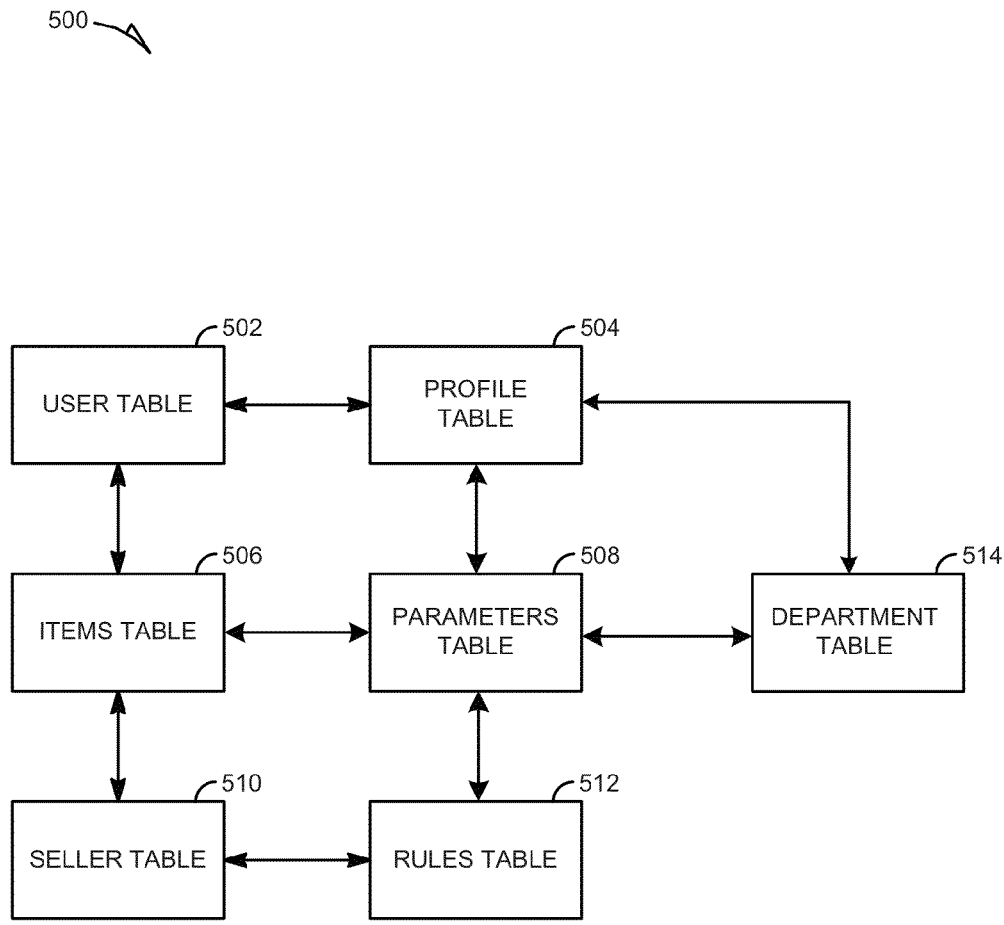
FIG. 5 is a high-level entity-relationship diagram, illustrating various tables that may be maintained, and that are utilized by and support the applications of the publication system.

FIG. 5 is a high-level entity-relationship diagram, illustrating various tables 500 that may be maintained within the databases 126, and that are utilized by and support the engines 120 and 122. A user table 502 contains a record for each registered user of the networked system 102, and may include identifier, address, profiles, and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

A profile table 504 contains a record of each profile that may be associated with one or more users. The profile table 504 may include records indicating the users associated with each profile.

The tables 500 also include an items table 506 in which are maintained item records for goods and services that are available to be, or have been, transacted via the networked system 102. Each item record within the items table 506 may furthermore be linked to one or more user records within the user table 502, so as to associate a seller and one or more actual or potential buyers with each item record.

A parameters table 508 includes data relating to each listing that is changeable based on the profiles within the profile table 504.

A seller table 510 contains a record for each seller within the networked system 102. The seller table 510 may relate each item within the items table 506 to a specific seller of the sellers in the networked system 102.

A rules table 512 includes rules received from the seller for each listing (each listing may be recorded in the items table 506 or in another table (not shown)). The rules table 512 may be accessed along with the parameters table 508 to render a listing based on the profile of the user.

A department table 514 may be included and may contain information relating to department-specific profiles and/or parameters. The department table 514 may further link to listings describing similar listings in the same department to provide additional parameters. For example, the department table 514 may include an indication that the seller has provided a first listing of a sweater in the color blue and a second listing of the same sweater in pink within the department "clothing." In these instances, the parameter "color" may be included in the parameters table 508 for both the sweaters.

Figure 6A:
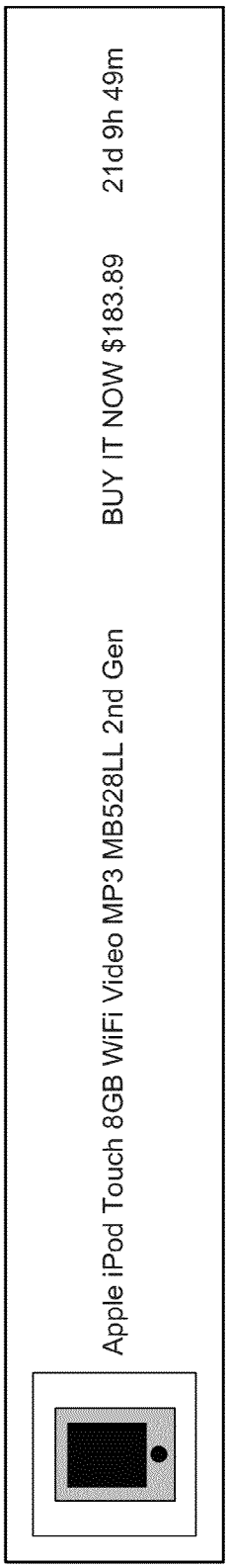
FIGS. 6A and 6B are examples of rendered listings based on a user profile.
Figure 6B:
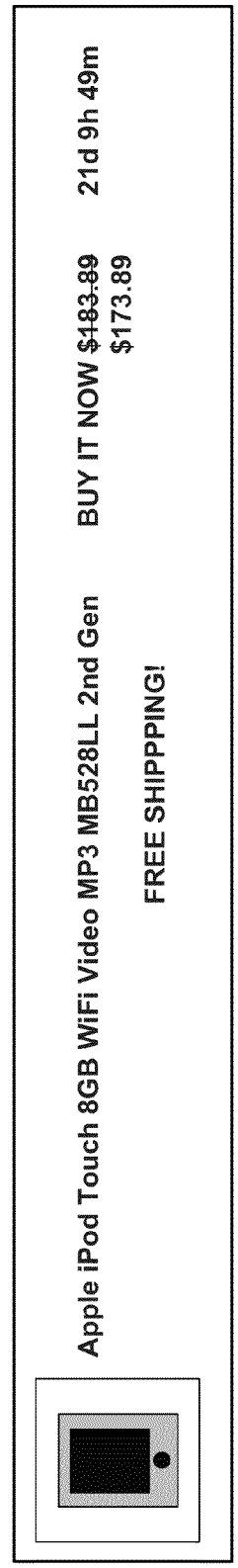

FIGS. 6A and 6B are examples of rendered listings based on a user profile. FIG. 6A depicts a default or unmodified listing for an "Apple iPod Touch 8GB WiFi Video MP3 MB528LL 2nd Gen." The listing includes a price of $183.89 with no indication of a discount or free shipping. The listing of FIG. 6B, while describing the same item being offered by the same seller, indicates that the user is eligible for free shipping and a special price of $173.89. The listing of FIG. 6B is generated based on the rules submitted by the seller and the profile of the user.

Figure 7A:
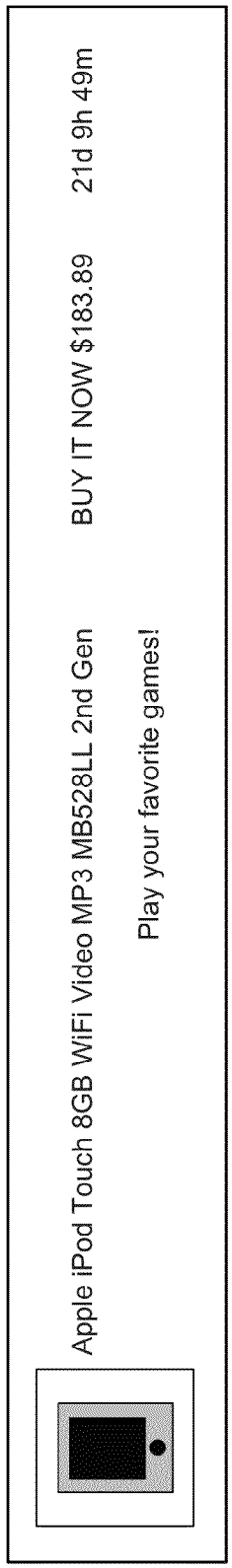
FIGS. 7A and 7B are further examples of rendered listings based on a user profile.
Figure 7B:
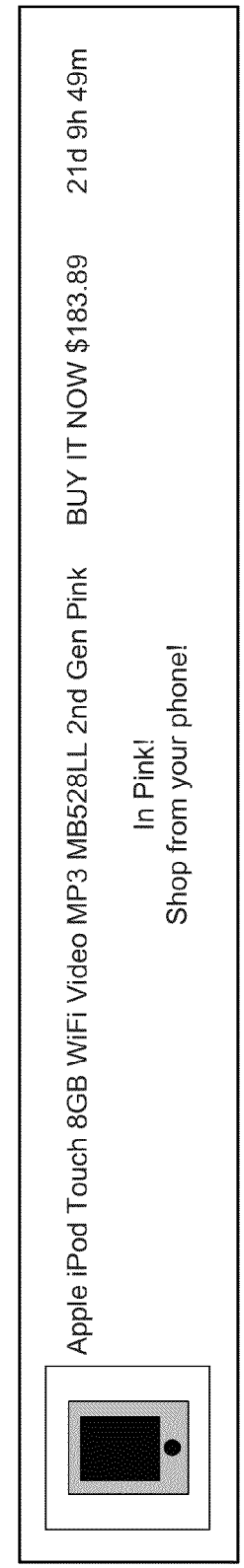

FIGS. 7A and 7B are further examples of rendered listings based on a user profile for the listing shown in FIG. 6A. The rendered listing in FIG. 7A includes the additional description of "Play your favorite games!" and may be rendered based on demographic information of a profile associated with the user. For example, the profile associated with the user viewing the listing of FIG. 7A may be "males, age 18-27."

FIG. 7B depicts another rendering of the same listing that is rendered based on another profile. In this instance, the same seller has another listing for the same item in another color (pink). For profiles associated with a demographic "women age 18-21," the listing of FIG. 7B shows the item "Apple iPod Touch 8GB WiFi Video MP3 MB528LL 2nd Gen" in the color pink and includes the additional description "In Pink! Shop from your phone!" It is noted that the listing of FIG. 6A may be modified or the listing associated with the item in pink may replace the listing of FIG. 6A.

Figure 8A:
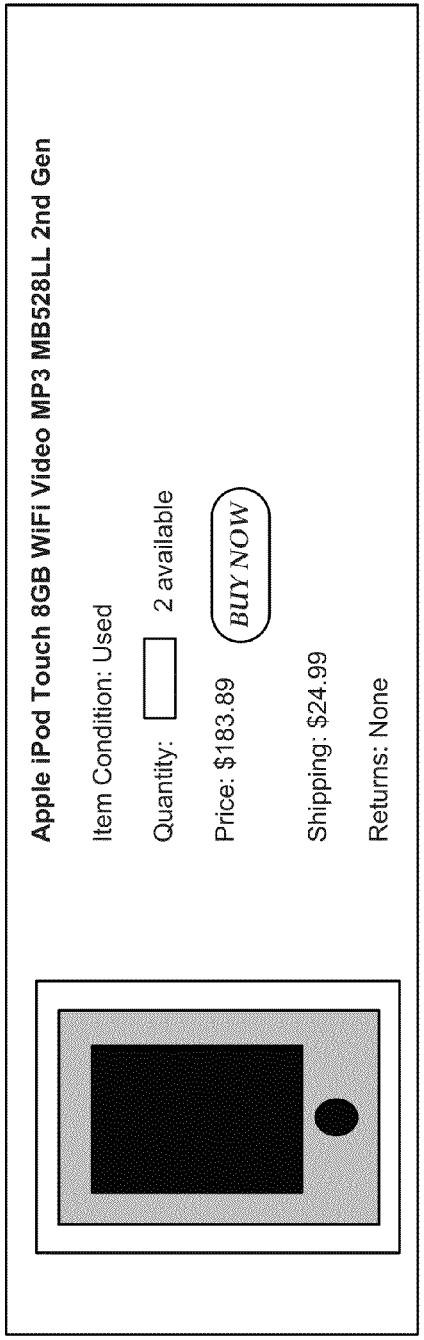
FIGS. 8A and 8B are additional examples of rendered listings based on a user profile.
Figure 8B:
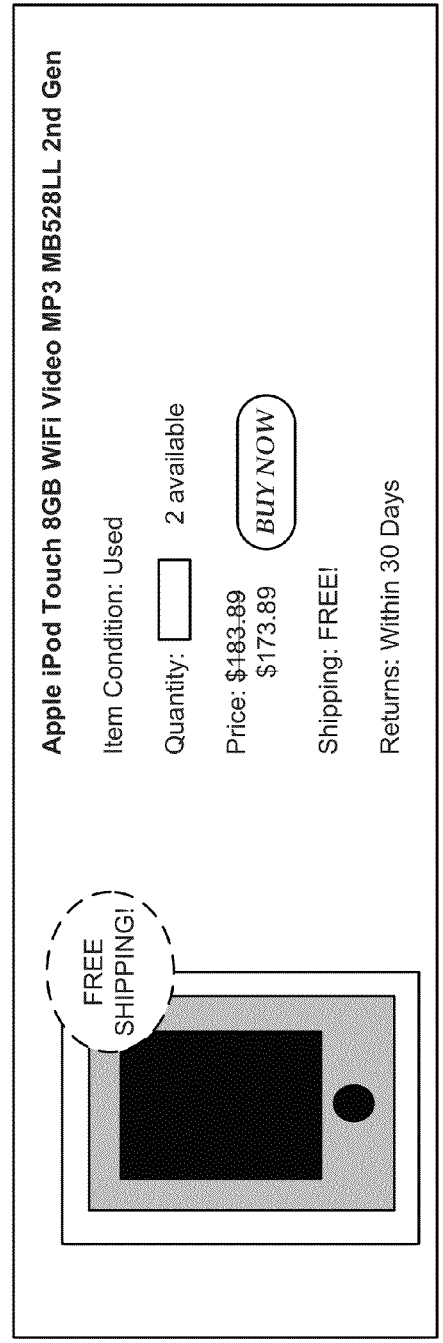

FIGS. 8A and 8B are additional examples of rendered listings based on a user profile. The listing of FIG. 8A may be an unmodified or default listing and/or may be associated with one or more profiles of user. The listing of FIG. 8A indicates that shipping is $24.99 and that no returns are accepted. In contrast, based on a user profile and rules provided by the seller, the listing of FIG. 8B includes the additional parameters "free shipping" and "Returns: Within 30 days." Additionally, the listing of FIG. 8B includes a modified (discounted) price of $173.89. Based on the rules provided by the seller, the listing of FIG. 8B may be rendered to "sticky" buyers who are more likely to purchase additional items from the seller in the future.

Figure 9:
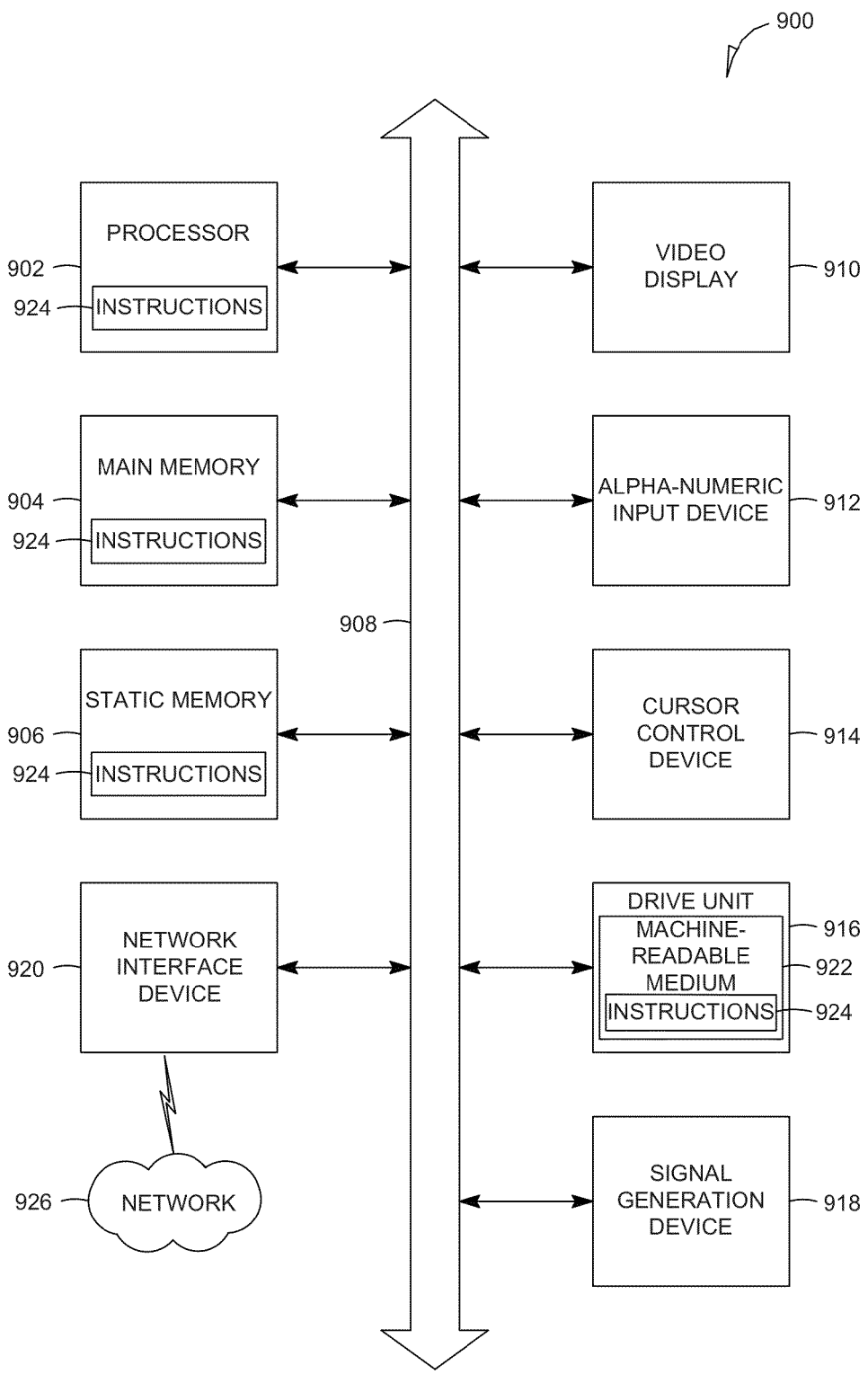
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In some instances, the video display unit 910 may be a touch screen for receiving input from a user. The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to segment users for listings in online publications have been described. Some technical problems that the present invention may be used to solve include more efficient data base management, reducing a number of operations performed on a database, and more efficient delivery of information to one or more users based on user characteristics. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a memory to store a listing created by a seller, the listing describing a plurality of attributes of an item for sale by the seller, including purchasing information; and
one or more processors to implement:
a user behavior module configured to associate a profile with a user based on at least one characteristic of the user determined from data collected about the user's activities on a network commerce system, the profile selected from a plurality of profiles, each respective profile of the plurality of profiles associated with a group of users that have a common characteristic that is different from each of the other users associated with the plurality of other profiles;
a rules module configured to receive a plurality of seller-specified rules, each rule specifying a modification of one of the plurality of attributes in the listing for a given profile in the plurality of profiles;
a modification module configured to modify one of the plurality of attributes described in the listing by applying a rule from the plurality of rules corresponding to the particular profile associated with the user.

2. The system of claim 1, wherein the characteristic comprises one of: age, gender, buying habits, departments associated with items purchased.

3. The system of claim 1, wherein at least one of the plurality of seller-specified rules is configured as an if-then statement.

4. The system of claim 1, wherein the modification of one of the plurality of attributes in the listing for a given profile in the plurality of profiles comprises a modification of the price of the item.

5. The system of claim 1, wherein the data collected about the user includes one of: demographic data, purchasing data, and buyer stickiness data, the stickiness data indicating a buyer's affinity for making frequent and repeat purchases from a same seller.

6. The system of claim 1, wherein the shared characteristic that is different is a seasonal tradition observed by the user.

7. The system of claim 1, comprising a marketplace module configured to provide the network commerce system.

8. A computer implemented method comprising:
in an electronic, network commerce system, using one or more computer processors to perform the operations of:
identifying a listing submitted by a seller describing a plurality of attributes of an item for sale by the seller including purchasing information;
associating a profile with a user based on at least one characteristic of the user determined from data collected about the user's activities on the network commerce system, the profile selected from a plurality of profiles, each respective profile of the plurality of profiles associated with a group of users that have a common characteristic that is different from each of the other users associated with the plurality of other profiles;
receiving a plurality of seller-specified rules, each rule specifying a modification of one of the plurality of attributes in the listing for a given profile in the plurality of profiles;
modifying one of the plurality of attributes described in the listing by applying a rule from the plurality of rules corresponding to the particular profile associated with the user.

9. The method of claim 8, wherein the characteristic comprises one of: age, gender, buying habits, departments associated with items purchased.

10. The method of claim 8, wherein at least one of the plurality of seller-specified rules is configured as an if-then statement.

11. The method of claim 8, wherein the modification of one of the plurality of attributes in the listing for a given profile in the plurality of profiles comprises a modification of the price of the item.

12. The method of claim 8, wherein the data collected about the user includes one of: demographic data, purchasing data, and buyer stickiness data, the stickiness data indicating a buyer's affinity for making frequent and repeat purchases from a same seller.

13. The method of claim 8, wherein the shared characteristic that is different is a seasonal tradition observed by the user.

14. The method of claim 8, comprising providing the network-based commerce system.

15. A non-transitory computer readable medium comprising instructions, which when performed by a computer, cause the computer to perform operations comprising:
identifying a listing submitted by a seller describing a plurality of attributes of an item for sale by the seller including purchasing information;
associating a profile with a user based on at least one characteristic of the user determined from data collected about the user's activities on the network commerce system, the profile selected from a plurality of profiles, each respective profile of the plurality of profiles associated with a group of users that have a common characteristic that is different from each of the other users associated with the plurality of other profiles;
receiving a plurality of seller-specified rules, each rule specifying a modification of one of the plurality of attributes in the listing for a given profile in the plurality of profiles;
modifying one of the plurality of attributes described in the listing by applying a rule from the plurality of rules corresponding to the particular profile associated with the user.

16. The computer readable medium of claim 15, wherein the characteristic comprises one of: age, gender, buying habits, departments associated with items purchased.

17. The computer readable medium of claim 15, wherein at least one of the plurality of seller-specified rules is configured as an if-then statement.

18. The computer readable medium of claim 15, wherein the modification of one of the plurality of attributes in the listing for a given profile in the plurality of profiles comprises a modification of the price of the item.

19. The computer readable medium of claim 15, wherein the data collected about the user includes one of: demographic data, purchasing data, and buyer stickiness data, the stickiness data indicating a buyer's affinity for making frequent and repeat purchases from a same seller.

20. The computer readable medium of claim 15, wherein the shared characteristic that is different is a seasonal tradition observed by the user.

21. The computer readable medium of claim 15, wherein the instructions include instructions, which when performed by the computer cause the computer to provide the network commerce system.

* * * * *